United States Patent
Muramatsu et al.

(10) Patent No.: US 10,658,904 B2
(45) Date of Patent: May 19, 2020

(54) ROTATING ELECTRICAL MACHINE

(71) Applicant: MITSUBISHI HITACHI POWER SYSTEMS, LTD., Kanagawa (JP)

(72) Inventors: Seijiro Muramatsu, Yokohama (JP); Kenta Igarashi, Yokohama (JP); Keiji Fugane, Yokohama (JP); Kentaro Yasumatsu, Yokohama (JP); Shinji Waki, Yokohama (JP); Hirohide Murayama, Yokohama (JP); Toru Muto, Yokohama (JP); Chuanhong Fan, Yokohama (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 58 days.

(21) Appl. No.: 16/134,514

(22) Filed: Sep. 18, 2018

(65) Prior Publication Data

US 2019/0089227 A1    Mar. 21, 2019

(30) Foreign Application Priority Data

Sep. 19, 2017   (JP) ................................ 2017-178883

(51) Int. Cl.
*H02K 9/16*        (2006.01)
*H02K 3/50*        (2006.01)
*H02K 5/20*        (2006.01)
(Continued)

(52) U.S. Cl.
CPC ................. *H02K 9/16* (2013.01); *H02K 3/50* (2013.01); *H02K 5/20* (2013.01); *H02K 5/225* (2013.01);
(Continued)

(58) Field of Classification Search
CPC .. H02K 9/16; H02K 9/08; H02K 3/50; H02K 5/20; H02K 5/225; H02K 7/1823; H02K 2203/06
(Continued)

(56) References Cited

U.S. PATENT DOCUMENTS 2,742,582 A * 4/1956 Bahn ...................... H01B 17/36
                                                     310/52
3,950,665 A * 4/1976 Schneider ................ H02K 3/22
                                                     310/260

(Continued)

FOREIGN PATENT DOCUMENTS

JP    60-183950 A      9/1985
JP    03105873 A  *    5/1991
(Continued)

OTHER PUBLICATIONS

Korean Office Action dated May 21, 2019 for the Korean Patent Application No. 10-2018-0110093.
(Continued)

*Primary Examiner* — Jeremy A Luks
(74) *Attorney, Agent, or Firm* — Volpe and Koenig, P.C.

(57) ABSTRACT

A rotating electrical machine includes: a rotor; a stator; a high voltage bushing; power lines connecting the stator coil to the bushing; a support insulator that supports the power lines; a rotating electrical machine outer casing that contains at least the rotor, the stator and a connection portion between the stator coil and the power lines, and is filled with hydrogen gas; and a terminal box which communicates with the outer casing and is attached to a lower portion of the outer casing, the insulator installed in the terminal box, and terminal box containing at least the power lines supported by the insulator and a part of the bushing connected to the supported power lines. The insulator is installed vertically on a bottom face of the terminal box, and the vertically (Continued)

installed insulator and a portion of the bushing in the terminal box are disposed in parallel with each other.

8 Claims, 10 Drawing Sheets

(51) Int. Cl.
    *H02K 7/18*         (2006.01)
    *H02K 5/22*         (2006.01)
    *H02K 9/08*         (2006.01)
    *F01D 15/10*       (2006.01)

(52) U.S. Cl.
    CPC ............ *H02K 7/1823* (2013.01); *H02K 9/08* (2013.01); *F01D 15/10* (2013.01); *H02K 2203/06* (2013.01)

(58) Field of Classification Search
    USPC ...................................... 310/55, 71
    See application file for complete search history.

(56) References Cited

U.S. PATENT DOCUMENTS

| | | | |
|---|---|---|---|
| 4,254,352 A * | 3/1981 | Fidei | H02K 3/505 310/71 |
| 4,488,072 A | 12/1984 | Archibald et al. | |
| 4,642,498 A * | 2/1987 | Archibald | H01F 38/38 310/176 |
| 6,856,059 B2 * | 2/2005 | Stewart | H01R 13/521 29/596 |
| 8,049,377 B2 * | 11/2011 | Joho | H02K 11/046 310/270 |
| 8,222,778 B2 * | 7/2012 | Kabata | H02K 3/22 174/15.3 |
| 9,966,820 B2 * | 5/2018 | Rigosu, Jr. | H01R 13/53 |
| 2003/0218395 A1 * | 11/2003 | Stewart | H01R 13/521 310/89 |
| 2013/0192025 A1 | 8/2013 | Taniyama et al. | |

FOREIGN PATENT DOCUMENTS

| | | |
|---|---|---|
| JP | 05-207701 A | 8/1993 |
| JP | 2013-158135 A | 8/2013 |

OTHER PUBLICATIONS

Extended European Search Report dated Jan. 24, 2019 for the European Patent Application No. 18189661.4.

* cited by examiner

ROTATING ELECTRICAL MACHINE

CLAIM OF PRIORITY

The present application claims priority from Japanese Patent Application JP 2017-178883 filed on Sep. 19, 2017, the content of which is hereby incorporated by reference into this application.

BACKGROUND OF THE INVENTION

The present invention relates to a rotating electrical machine, especially to a rotating electrical machine suitable for including a terminal box which contains a support insulator to cool the surrounding of a high voltage bushing which takes out electricity from a stator coil to an outside of the machine and support a power line connected to the high voltage bushing.

In general, a large rotating electrical machine filled with pressurized hydrogen gas in the machine, such as a generator of a thermal power generation, employs a high voltage bushing to take out electricity from a stator coil to the outside of the machine and seal the hydrogen gas in the machine. Some high voltage bushings directly cool an inner conductor with coolant gas. In addition, there are high voltage bushings to allow hydrogen gas to directly flow inside an armature lead of the power line connected to the high voltage bushing for cooling.

The terminal box described above contains an armature lead, a support insulator that supports the armature lead, a flexible lead that connects the armature lead with a lead wire connected to a connection ring for coupling a power supply terminal of the stator coil.

Conventionally, the support insulator described above is installed and fixed horizontally to the terminal box in the vicinity of the flexible lead that connects the armature lead on the high voltage bushing side to the lead wire from the connection line (connection ring) of the stator coil. The support insulator functions as a strength member for supporting the armature lead as well as a cooling flow path for the coolant gas.

For example, JP-S60-183950 (JP-1985-183950) discloses a background art in the present technical field. JP-S60-183950 discloses following features. A lead box (terminal box) of a rotating electrical machine is a cover for protecting a connection portion between an output lead and a power transmission bus bar, and an upper portion of the lead box is attached to a lower portion of an outer casing of the rotating electrical machine and insides of the respective members communicate with each other. The output lead of the rotating electronic machine and the power transmission bus bar are connected through a lead bushing (high voltage bushing) attached to the lower portion of the lead box and a lead connection in the lead box. Since a relatively high voltage is applied to the output lead connection and the lead bushing, there is a need to subject tape winding insulation after a final connection and also ensure an insulation creepage distance and an electrical gap. Furthermore, the respective insides of the rotating electrical machine outer casing and the lead box communicate with each other. To reduce a rise in an ambient temperature due to heat radiation from an energization portion inside the lead box, the coolant gas in the rotating electrical machine outer casing is led to the inside of the lead box to cool the output lead, the lead connection, and the lead bushing.

In the conventional structure described above in which the support insulator is horizontally attached to the terminal box, there is a need to increase a height of the terminal box by the amount corresponding to the attachment of the support insulator. In other words, since there is a need to secure an insulation distance from the high voltage bushing and to secure a work space for maintenance of the high voltage bushing, the height of the terminal box is required to be increased by the amount corresponding to the attachment of the support insulator, causing a disadvantage in terms of strength with the increased height of the terminal box.

In addition, since the inside of the generator (rotating electrical machine) is filled with the pressurized coolant gas, measures that a thickness of a bottom face is increased as size of the terminal box increases and that ribs are attached to a lateral face or a bottom face of the terminal box are required to suppress a deformation of the terminal box.

Unfortunately, JP-S60-183950 discloses nothing about any means for solving the problem described above.

SUMMARY OF THE INVENTION

The present invention is to solve the problems described above. An object of the present invention is to provide a rotating electrical machine which reduces a height of a terminal box and satisfies the height restriction with a margin without taking measures for suppressing the deformation of the terminal box.

In order to achieve the above object, a rotating electrical machine of the present invention comprises: a rotor; a stator that faces the rotor with a predetermined gap and includes a stator core and a stator coil; at least one high voltage bushing that outputs electricity from the stator coil to an outside of the machine; a plurality of power lines that connect the stator coil to the high voltage bushing to form an electrical path; at least one support insulator that supports the power lines; a rotating electrical machine outer casing that contains at least the rotor, the stator and a connection portion between the stator coil and the power lines, and is internally filled with a hydrogen gas; and a terminal box which communicates with the rotating electrical machine outer casing and is attached to a lower portion of the rotating electrical machine outer casing, the support insulator installed in the terminal box, and the terminal box containing at least the power lines supported by the support insulator and a part of the high voltage bushing connected to the supported power lines. The support insulator is installed vertically on a bottom face of the terminal box. The support insulator installed vertically and a portion of the high voltage bushing located in the terminal box are disposed in parallel with each other.

According to the present invention, a rotating electrical machine is provided which reduces a height of a terminal box and satisfies the height restriction with a margin without taking measures for suppressing the deformation of the terminal box.

DESCRIPTION OF THE PREFERRED EMBODIMENTS

A rotating electrical machine according to embodiments of the present invention will be described with reference to a conventional rotating electrical machine. In the drawings, the same components are denoted by the same reference characters, and a detailed description of the same components will be omitted.

First, a rotating electrical machine according to embodiments of the present invention will be described with reference to FIG. 1.

Figure 1:
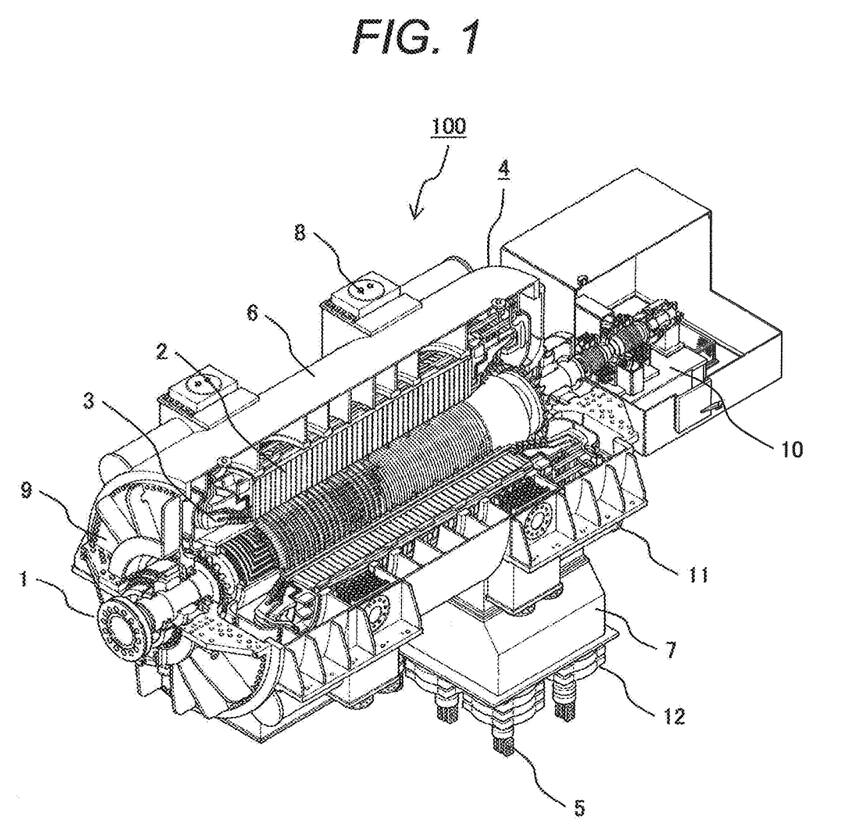
FIG. 1 is a partially broken perspective view showing an entire structure of a rotating electrical machine according to the present invention.

As shown in FIG. 1, a rotating electrical machine (generator) 100 cooled with hydrogen gas generally includes a stator coil that is cooled with water according to an output (capacity) and is classified into one of three types of rotating electrical machines, a water-cooled rotating electrical machine whose inside is cooled with the hydrogen gas, a hydrogen-cooled rotating electrical machine whose inside is cooled with the hydrogen gas, and an air-cooled rotating electrical machine whose inside is cooled with air. In the water-cooled rotating electrical machine and the hydrogen-cooled rotating electrical machine among those rotating electrical machines, the inside of the machine is filled with the pressurized hydrogen gas. FIG. 1 shows the rotating electrical machine 100 whose inside is filled with the hydrogen gas.

The rotating electrical machine 100 shown in FIG. 1 roughly includes a rotor 1; a stator 4 that is disposed opposite to the rotor 1 with a predetermined gap between the rotor 1 and the stator 4 and includes a stator core 2 and a stator coil 3; a high voltage bushing 5 that outputs an electricity from the stator coil 3 to an outside of the machine; and power lines to be described later including a connection ring 13, a lead wire 14, a flexible lead 15, and an armature lead 16. The power lines connect the stator coil 3 to the high voltage bushing 5 to form an electrical path. The rotating electrical machine 100 also includes a support insulator 17 to be described later which supports the armature lead 16 among those power lines, and a rotating electrical machine outer casing 6 that contains at least the rotor 1, the stator 4 and a connection portion between the stator coil 3 and the connection ring 13 among those power lines. The inside of the rotating electrical machine outer casing 6 is filled with the hydrogen gas. The rotating electrical machine 100 further includes a terminal box 7 that communicates with the rotating electrical machine outer casing 6 and is attached to a lower portion of the rotating electrical machine outer casing 6. The support insulator 17 is installed in the terminal box 7. The terminal box 7 contains the armature lead 16 supported by the support insulator 17 and an end portion in the machine of the high voltage bushing 5 connected to the armature lead 16. The rotating electrical machine 100 further includes a hydrogen cooler 8 for cooling the interior of the rotating electrical machine 100 with hydrogen gas; an end bracket 9 for closing an axial end of the rotating electrical machine outer casing 6; a brush gear 10; a footing 11 for installing and fixing the rotating electrical machine 100; and a current transformer 12 for measuring an output current to the outside from the high voltage bushing 5.

For example, in a turbine generator of thermal power generation, a rotation energy of a steam turbine or a gas turbine is transmitted to the rotor 1, and the rotor 1 is rotated at a high speed inside the stator coil (stator winding) 3 to perform a power generation.

The stator 4 in a hydrogen-cooled turbine generator includes the stator core 2 formed by laminating silicon steel plates in an axial direction and the stator coil 3 mounted in the stator core 2. In addition, the stator 4, shown in FIG. 2A and FIG. 2B, includes the connection ring 13 for coupling the stator coil 3 to a power supply terminal, the lead wire 14 for taking out electricity generated inside the machine to the outside, the flexible lead 15, the armature lead 16, the high voltage bushing 5, and the support insulator 17 that supports the armature lead 16.

Figure 3:
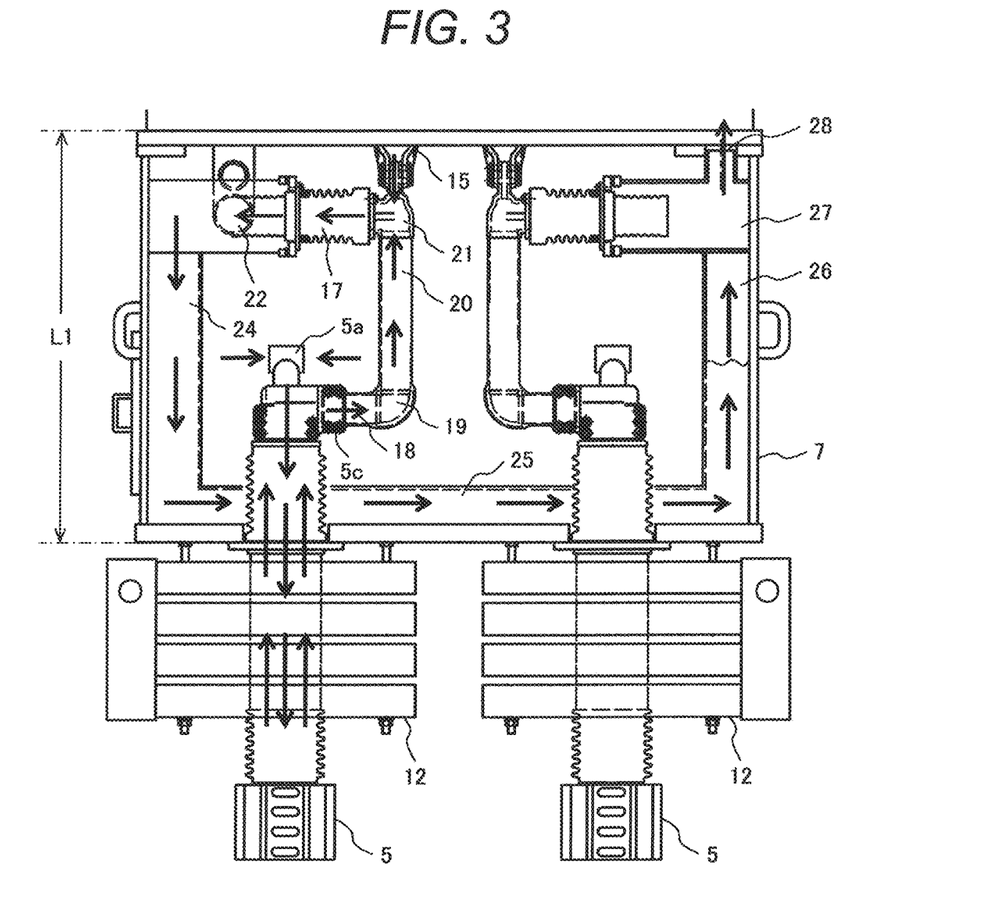
FIG. 3 is a cross-sectional view showing a detail of the structure around the terminal box in the conventional rotating electrical machine shown in FIG. 2A when viewed from the lateral direction.
Figure 4:
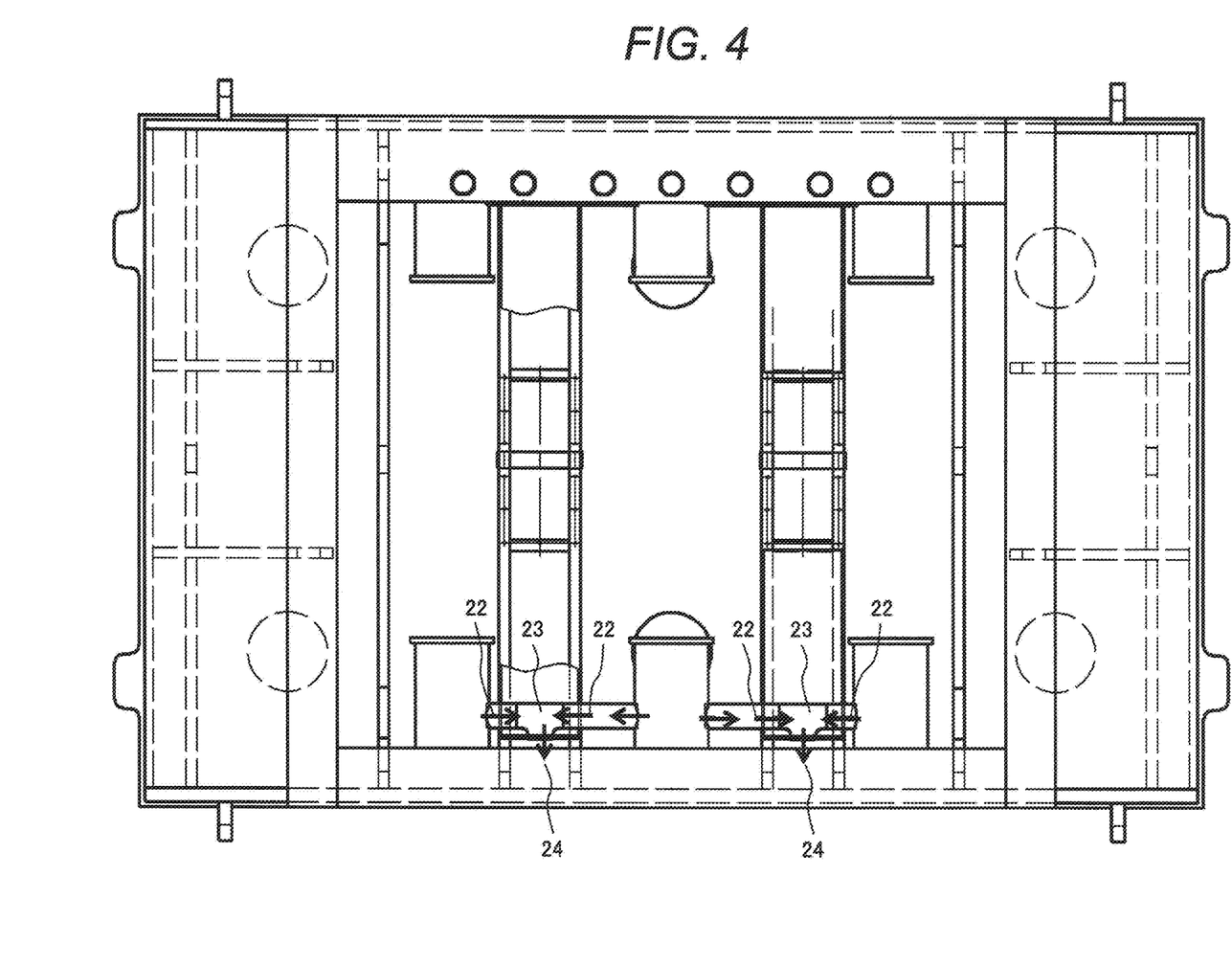
FIG. 4 is a cross-sectional view showing the structure around the terminal box in the conventional rotating electrical machine when viewed from above.
Figure 5:
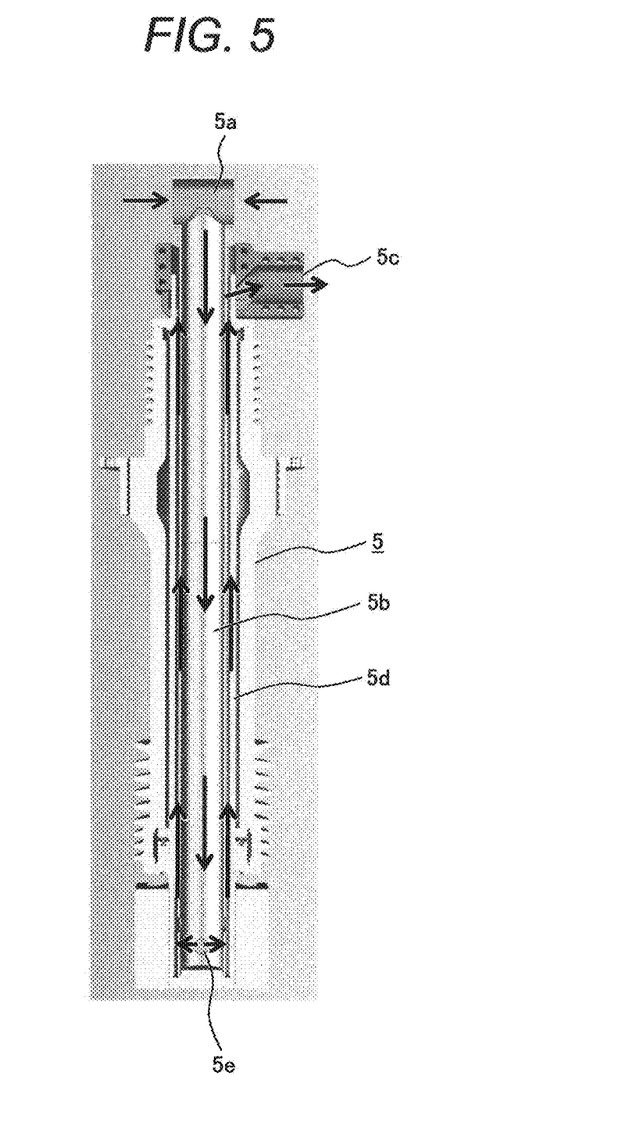
FIG. 5 is a cross-sectional view showing a high voltage bushing employed in a rotating electrical machine according to the present invention.

With reference to FIGS. 2A, 2B, 3, and 4, an example of a structure in the terminal box 7 of the conventional turbine generator (rotating electrical machine) will be described. With reference to FIG. 5, a detailed structure of the high voltage bushing 5 will be described.

Figure 2A:
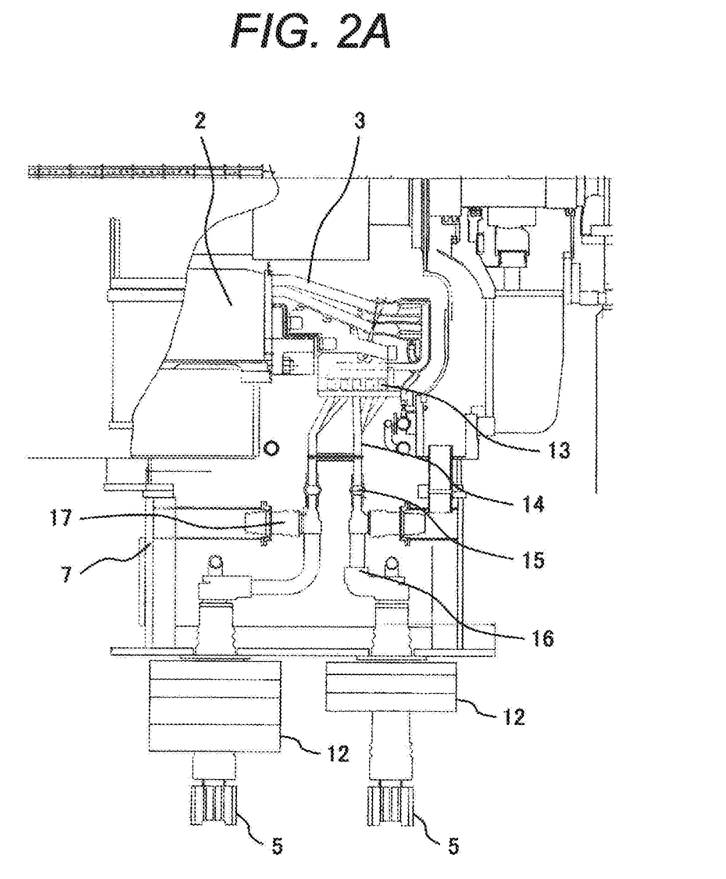
FIG. 2A is a cross-sectional view showing a structure around an end and a terminal box in a conventional rotating electrical machine when viewed from a lateral direction.
Figure 2B:
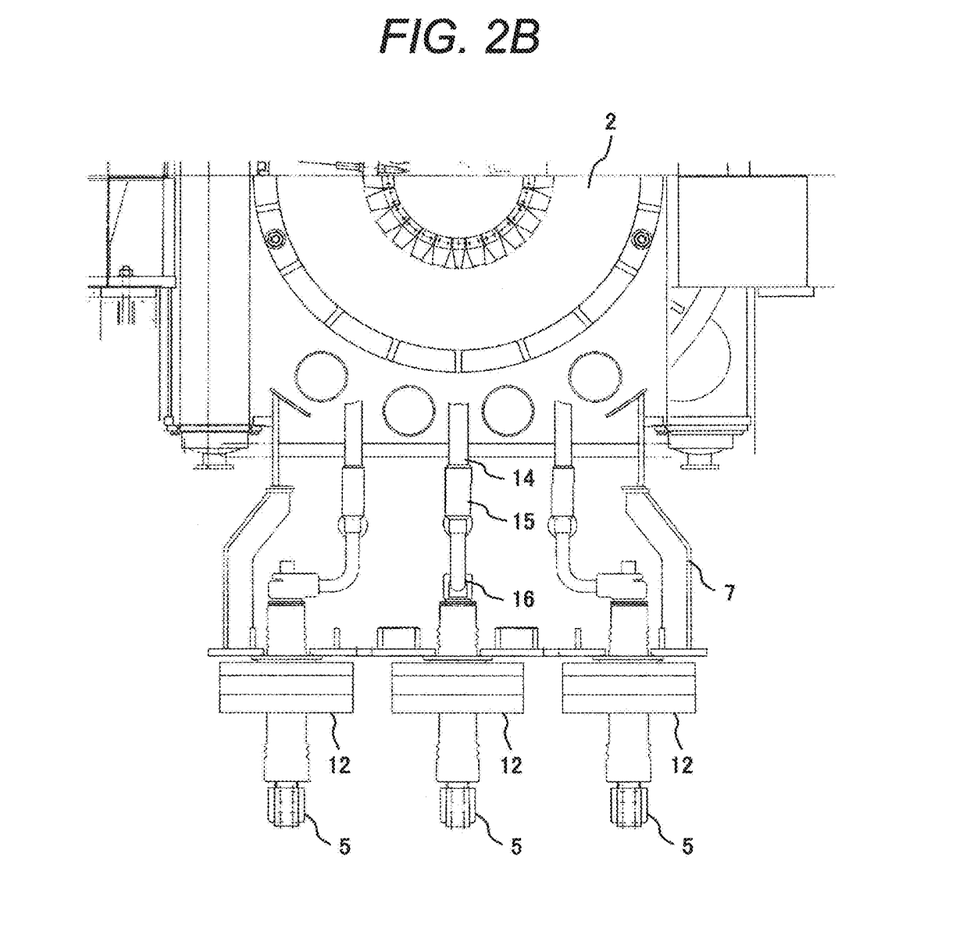
FIG. 2B is a cross-sectional view showing a structure around an end and a terminal box in a conventional rotating electrical machine when viewed from an axial direction.

The flexible lead 15, the armature lead 16, and the high voltage bushing 5 shown in FIGS. 2A and 2B have a structure to be cooled by allowing hydrogen gas to pass through the interior of those components. FIG. 3 shows a diagram of a structure around the terminal box 7 in the conventional turbine generator when viewed from a lateral direction. FIG. 4 shows the structure around the terminal box 7 in the conventional turbine generator when viewed from above. A flow of the coolant gas in the terminal box 7 will be described.

The details of the high voltage bushing 5 are shown in FIG. 5. As shown in FIG. 5, the high voltage bushing 5 includes a high-voltage-bushing insulation cylinder 5b having a high-voltage-bushing coolant gas inlet port 5a and a hollow inside; an external copper tube 5d covering an outer periphery of the high-voltage-bushing insulation cylinder 5b with a predetermined space and having a high-voltage-bushing exhaust port 5c; and a hole 5e which is provided in a lower portion of the high-voltage-bushing insulation cylinder 5b and communicates with a space between the external copper tube 5d and the high-voltage-bushing insulation cylinder 5b.

The coolant gas entering from the high-voltage-bushing coolant gas inlet port 5a passes through an inside of the high-voltage-bushing insulation cylinder 5b and flows to a lower portion of the high voltage bushing 5. Since the hole 5e is opened in the high-voltage-bushing insulation cylinder 5b in the lower portion of the high voltage bushing 5, the coolant gas passes through the hole 5e, passes through a space between the external copper tube 5d and the high-voltage-bushing insulation cylinder 5b, and flows upward. The coolant gas passing through the space between the external copper tube 5d and the high-voltage-bushing insulation cylinder 5b and flowing upward is exhausted in the horizontal direction from the high-voltage-bushing exhaust port 5c in the upper portion of the high voltage bushing 5 and flows into the copper pipe 18 in the horizontal direction shown in FIG. 3. The flowing direction of the coolant gas flowing through the copper pipe 18 in the horizontal direction is bent by 90 degrees upward in the elbow pipe 19, passes through the copper pipe 20 in the vertical direction, and advances to the root component 21 for the flexible lead 15, where the coolant gas merges with coolant gas from above which has cooled the flexible lead 15. Further, the coolant gas bends by 90 degrees in the root component 21 for the flexible lead 15, flows in the horizontal direction, and advances to the inside of the support insulator 17 installed in the horizontal direction. The gas leaving the support insulator 17 bends by 90 degrees and enters the vent pipe 22. As shown in FIG. 4, in the vent pipe 22, the coolant gases from the adjacent high voltage bushings 5 merge with each other in the T-pipe 23 and enters the terminal-box lateral-face duct 24 installed on the terminal box wall.

As shown in FIGS. 2A and 2B, three high voltage bushings 5 aligned in the horizontal direction are arrayed in two rows in the axial direction. After the coolant gases from the three high voltage bushings 5 in FIG. 2A bend by 90 degrees and enter the terminal-box lateral-face duct 24, the coolant gases flow downward of the terminal-box lateral-face duct 24 as shown in FIG. 3. The coolant gases further bend by 90 degrees in the horizontal direction in the lower portion of the terminal-box lateral-face duct 24. After the coolant gases flow in the horizontal direction through a terminal-box bottom-plate rectangular duct 25 installed on a bottom plate of the terminal box 7, the coolant gases bend upward by 90 degrees and flow upward through the terminal-box lateral-face duct 26 installed on an opposite wall of the terminal-box lateral-face duct 24.

The coolant gases flowing upward in the terminal-box lateral-face duct 26 enters a coolant gas junction chamber 27 in an upper portion of the terminal box 7. The coolant gases in the two duct terminal-box lateral-face ducts 24 and 26 and the coolant gases from three high voltage bushings 5 on the exhaust port side merge with each other in the coolant gas junction chamber 27, and are then exhausted through multiple exhaust gas pipes 28.

Figure 6:
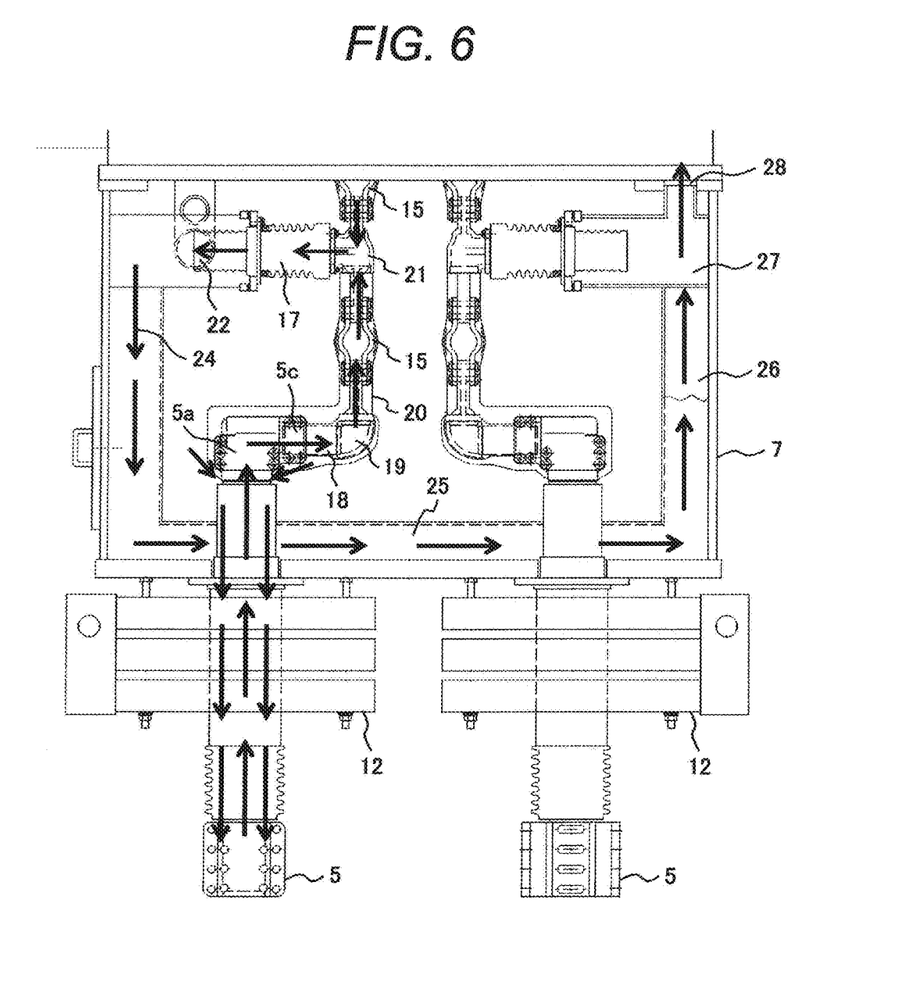
FIG. 6 is a cross-sectional view showing a detail of another structure around a terminal box in a conventional rotating electrical machine when viewed from the lateral direction, corresponding to FIG. 3.

FIG. 6 is a diagram showing an example of another structure around the terminal box in the conventional rotating electrical machine when viewed from the lateral direction, which corresponds to FIG. 3.

As shown in FIG. 6, in this example, the coolant gas to each high voltage bushing 5 enters from the outer periphery side of the high voltage bushing 5, flows downward (opposite direction to that in the example of FIG. 3) through the space between the external copper tube 5d and the inner high-voltage-bushing insulation cylinder 5b in FIG. 5, and passes through the hole 5e of the high-voltage-bushing insulation cylinder 5b on the bottom. Thereafter, the coolant gas moves upward (opposite direction to that in the example of FIG. 3) through the inside of the high-voltage-bushing insulation cylinder 5b. Then, the coolant gas is exhausted in the horizontal direction from the upper portion of the high voltage bushing 5 through the high-voltage-bushing exhaust port 5c and flows into the copper pipe 18. The coolant gas from the copper pipe 18 bends upward by 90 degrees in the elbow pipe 19, passes through the copper pipe 20 and the flexible lead 15 which are in the vertical direction, and advances to the root component 21 for the flexible lead 15. The subsequent flow of the coolant gas is the same as that in the vent pattern of the example described with reference to FIGS. 3 and 4.

First Embodiment

Figure 7:
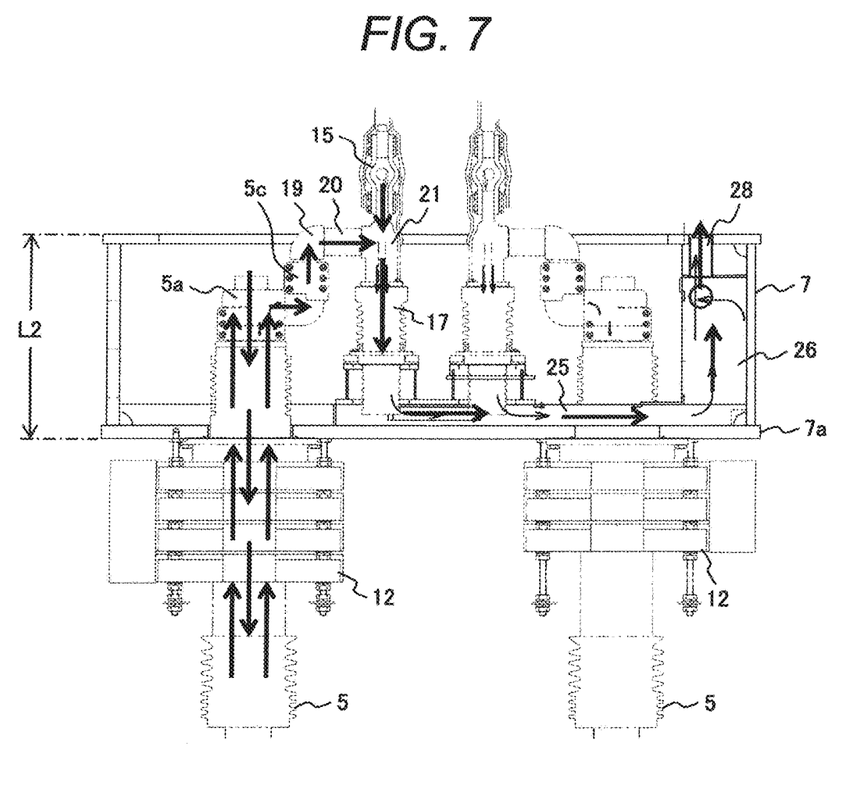
FIG. 7 is a cross-sectional view of a structure around a terminal box in a rotating electrical machine according to a first embodiment of the present invention when viewed from a lateral direction.
Figure 8:
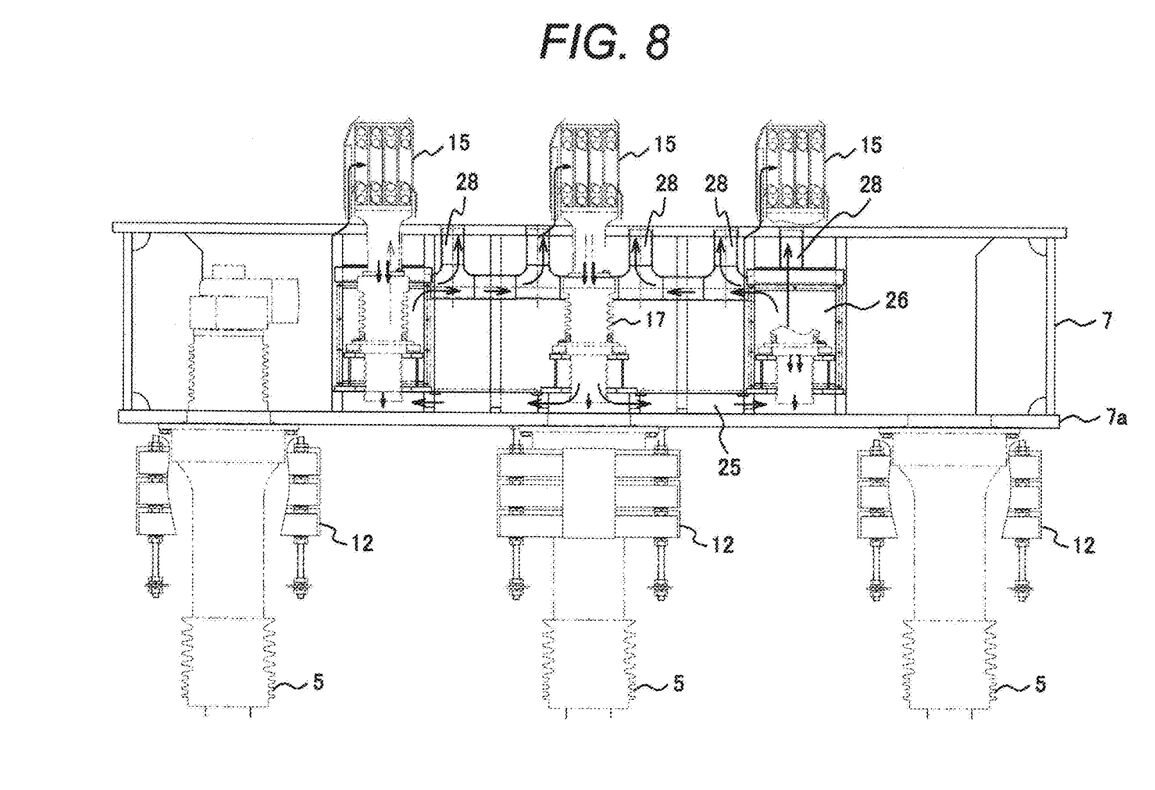
FIG. 8 is a cross-sectional view of a structure around a terminal box in a rotating electrical machine according to a first embodiment of the present invention when viewed from an axial direction.
Figure 9:
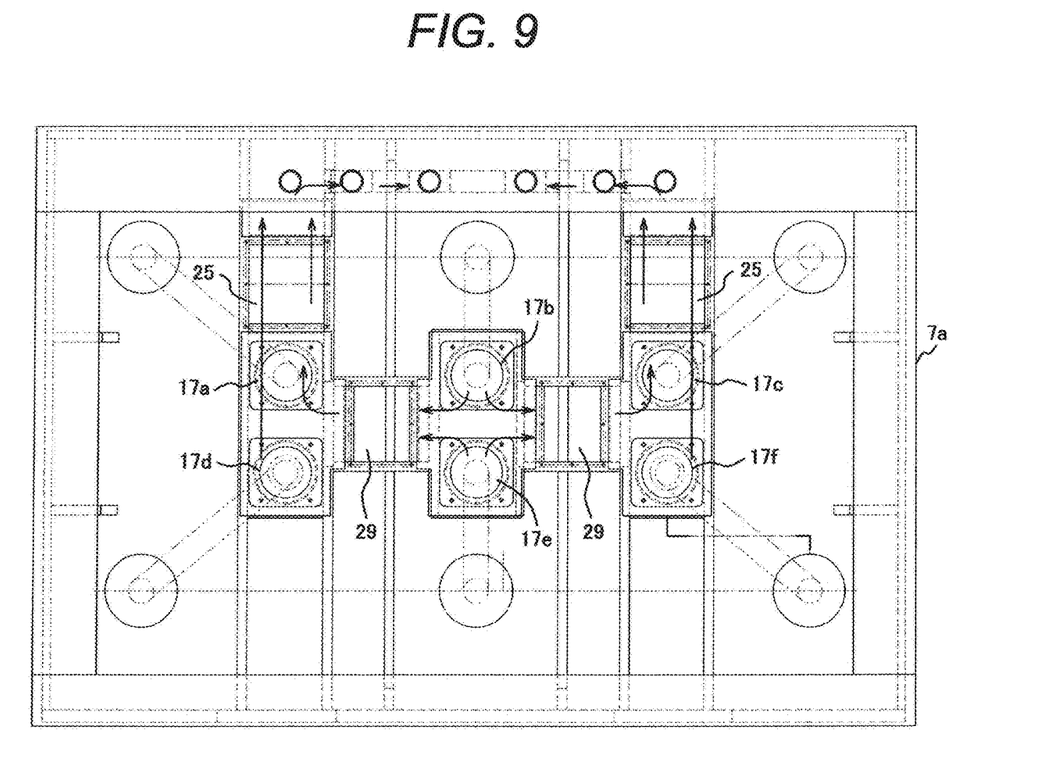
FIG. 9 is a cross-sectional view of a structure around a terminal box in a rotating electrical machine according to a first embodiment of the present invention when viewed from above.

With reference to FIGS. 7, 8, and 9, a structure in a terminal box of a rotating electrical machine according to the first embodiment of the present invention will be described as compared with the structure in the conventional terminal box shown in FIGS. 3, 4, and 6.

FIG. 7 is a cross-sectional view of a structure around the terminal box in the rotating electrical machine according to the first embodiment of the present invention when viewed in a lateral direction. FIG. 8 is a cross-sectional view of the structure around the terminal box in the rotating electrical machine according to the first embodiment of the present invention when viewed in an axial direction. FIG. 9 is a plan view of the structure around the terminal box in the rotating electrical machine according to the first embodiment of the present invention when viewed from above.

With reference to FIGS. 7 and 8, the structure in the terminal box of the rotating electrical machine according to the first embodiment of the present invention will be described.

As shown in FIGS. 7 and 8, in the internal structure of the terminal box of the rotating electrical machine according to the first embodiment of the present invention, the support insulator 17 is installed in the vertical direction on a bottom face 7a of a terminal box 7. The support insulator 17 installed in the vertical direction and a portion of a high voltage bushing 5 located in the terminal box 7 are disposed in parallel with each other.

A high-voltage-bushing coolant gas inlet port 5a is provided in an upper portion of the high voltage bushing 5. A coolant gas which has entered from this high-voltage-bushing coolant gas inlet port 5a passes through the inside of the high-voltage-bushing insulation cylinder 5b and flows to a lower portion of the high voltage bushing 5 as in the above description with reference to FIG. 3. Since the hole 5e is opened in the high-voltage-bushing insulation cylinder 5b in the lower portion of the high voltage bushing 5, the coolant gas passes through the hole 5e, passes through the space between the external copper tube 5d and the high-voltage-bushing insulation cylinder 5b, and flows toward the upper portion of the high voltage bushing 5.

A high-voltage-bushing exhaust port 5c for exhausting the coolant gas passing through the space between the external copper tube 5d and the high-voltage-bushing insulation cylinder 5b and flowing upward is provided in the upper portion of the high voltage bushing 5. The high-voltage-bushing exhaust port 5c is connected to an elbow pipe 19, and the elbow pipe 19 is connected to a root component 21 for a flexible lead 15 by a horizontal copper pipe 20.

In the root component 21 for the flexible lead 15, the coolant gas from the copper pipe 20 in the horizontal direction and the coolant gas from above which has cooled the flexible lead 15 merge with each other and flow to the support insulator 17 installed in the vertical direction on the bottom face 7a of the terminal box 7 as described above.

With reference to FIGS. 7, 8, and 9, the vent pattern of the internal structure of the terminal box in the rotating electronic machine according to the first embodiment of the present invention will be described.

As shown in FIG. 7, the ventilation in the high voltage bushing 5 is the same as that of the high voltage bushing 5 described with reference to FIG. 5. As the above description with reference to FIG. 3, the coolant gas entering from the high-voltage-bushing coolant gas inlet port 5a passes through the inside of the high voltage bushing insulation tube 5b and flows to the lower portion of the high voltage bushing 5. In the lower portion of the high voltage bushing 5, since the hole 5e is opened in the high voltage bushing insulation tube 5b, the coolant gas passes through the hole 5e, passes through the space between the external copper tube 5d and the high-voltage-bushing insulation cylinder 5b, and flows toward the upper portion of the high voltage bushing 5 (refer to FIG. 5).

The coolant gas flowing toward the upper portion of the high voltage bushing 5 advances horizontally to the high-voltage-bushing exhaust port 5c in the upper portion of the high voltage bushing 5 and enters the elbow pipe 19 from the high-voltage-bushing exhaust port 5c installed vertically. The coolant gas bends in the horizontal direction by 90 degrees in the elbow pipe 19 and advances to the root component 21 for the flexible lead 15 through the horizontal copper pipe 20, where the coolant gas merges with the coolant gas from above which has cooled the flexible lead 15. The coolant gases that have merged with each other in the root component 21 for the flexible lead 15 advance to the inside of the support insulator 17 installed vertically on the bottom face 7a of the terminal box 7.

After the coolant gas leaving the support insulator 17 flows horizontally through the terminal-box bottom-plate rectangular duct 25 installed on the bottom plate of the terminal box 7, the coolant gas bends upward by 90 degrees, flows upward through the terminal-box lateral-face duct 26, and is exhausted through the multiple exhaust gas pipes 28.

In other words, the exhaust gas from the high voltage bushing 5 in the present embodiment is exhausted upward through the high-voltage-bushing exhaust port 5c in the structure of the present embodiment shown in FIGS. 7 and 8, whereas the exhaust gas is exhausted in the horizontal direction in the conventional structures in FIGS. 3 and 6. Thereafter, the exhaust gas passes through the elbow pipe 19 and the copper pipe 20 and merges with the gas from above which has cooled the flexible lead 15 in the root component 21 for the flexible lead 15. The exhaust gas flows downward from the root component 21 for the flexible lead 15, passes through the support insulator 17 installed vertically, and enters the terminal-box bottom-plate rectangular duct 25 installed on the bottom face 7a of the terminal box 7.

As shown in FIG. 9, the coolant gases exhausted from six support insulators 17a, 17b, 17c, 17d, 17e and 17f merge with each other on the bottom face 7a of the terminal box 7 and flow into two terminal-box bottom-plate rectangular ducts 25. The coolant gases from two central support insulators 17b and 17e of the six support insulators 17a, 17b, 17c, 17d, 17e, and 17f are divided into right and left, pass through the support-insulator exhaust-gas junction duct 29 on the bottom face 7a of the terminal box 7. Then, the coolant gases merge with the coolant gases from the support insulators 17a, 17d, 17c and 17f at the ends of the six support insulators 17a, 17b, 17c, 17d, 17e, and 17f, and advance to the terminal-box bottom-plate rectangular duct 25 on the bottom face 7a of the terminal box 7. Thereafter, as shown in FIGS. 7 and 8, the coolant gas flows upward vertically through the terminal-box lateral-face duct 26 and then is exhausted through the multiple exhaust gas pipes 28.

According to the present embodiment described above, the support insulators 17 are installed vertically on the bottom face 7a of the terminal box 7, and the terminal-box bottom-plate rectangular duct 25 connecting the support insulators 17 is installed on the bottom face 7a of the terminal box 7. Therefore, the height of the terminal box 7 is reduced (L2 in FIG. 7 is smaller than L1 in FIG. 3), thereby satisfying the height restriction with a margin.

Reducing the height of the terminal box 7 increases the rigidity of the lateral face, decreases deformation caused by the gas pressure inside the machine and vibration amplitude during operation. Moreover, reducing the height of the terminal box 7 decreases a material used for constructing the machine, which is economical.

In addition, in the vent structure in which the support insulator 7 is installed vertically, a length of a vent path is shorter compared with a structure in which the support insulator 7 is installed horizontally, reducing the vent resistance, leading to an advantage in cooling the surrounding of the high voltage bushing 5. In other words, in the conventional art, the vent resistance is larger in a flow path of the coolant gas passing through the support insulator 17 installed horizontally since the flow path from the high-voltage-bushing exhaust port 5c of the high voltage bushing 5 to the exhaust port of the exhaust gas pipe 28 is long and has more bends, resulting in a disadvantage of cooling. The present embodiment eliminates this disadvantage.

In the present embodiment, the vent pipe 22 and the T-pipe 23 (refer to FIG. 4) at an outlet of the support insulator 7 in the conventional structure are eliminated, and the support-insulator exhaust-gas junction duct 29 (refer to FIG. 9) is installed for the exhaust gas from the support insulators 17 to join together, the support insulators 17 integrated with the bottom face 7a of the terminal box 7. This configuration shortens the distance of the flow path from the high-voltage-bushing exhaust port 5c to the exhaust port of the exhaust gas pipe 28 and simplifies the structure, reducing the vent resistance, increasing the rigidity of the bottom plate 7a of the terminal box 7, and decreasing deformation caused by the gas pressure inside the machine and vibration amplitude during operation.

The present invention is not limited to the foregoing embodiments, and the foregoing embodiments may be variously modified. The foregoing embodiments have been described in detail, for example, in order to facilitate the understanding of the present invention. The present invention is not limited to embodiments including all the above-described elements. Some elements of an embodiment may be replaced by the elements of another embodiment. Further, the elements of an embodiment may be added to another embodiment. Furthermore, some elements of each embodiment may be deleted, subjected to the addition of other elements, or replaced by other elements.

LIST OF THE REFERENCE CHARACTERS

1 . . . rotor
2 . . . stator core
3 . . . stator coil (stator winding)
4 . . . stator
5 . . . high voltage bushing
5a . . . high-voltage-bushing coolant gas inlet port
5b . . . high-voltage-bushing insulation cylinder
5c . . . high-voltage-bushing exhaust port
5d . . . external copper tube
5e . . . hole
6 . . . rotating electrical machine outer casing 7 . . . terminal box
7a . . . bottom face of terminal box
8 . . . hydrogen cooler
9 . . . end bracket
10 . . . brush gear
11 . . . footing
12 . . . current transformer
13 . . . connection ring
14 . . . lead wire
15 . . . flexible lead
16 . . . armature lead
17, 17a, 17b, 17c, 17d, 17e, 17f . . . support insulators
18, 20 . . . copper pipes
19 . . . elbow pipe
21 . . . root component for flexible lead
22 . . . vent pipe
23 . . . T-pipe
24, 26 . . . terminal-box lateral-face ducts
25 . . . terminal-box bottom-plate rectangular duct
27 . . . coolant gas junction chamber
28 . . . exhaust gas pipe
29 . . . support-insulator exhaust-gas junction duct
100 . . . rotating electrical machine

What is claimed is:

1. A rotating electrical machine comprising:
a rotor;
a stator that faces the rotor with a predetermined gap and includes a stator core and a stator coil;
a high voltage bushing that outputs electricity from the stator coil to an outside of the machine;
a plurality of power lines that connect the stator coil to the high voltage bushing to form an electrical path;
a support insulator that supports the power lines;
a rotating electrical machine outer casing that contains at least the rotor, the stator and a connection portion between the stator coil and the power lines, and is internally filled with a hydrogen gas; and
a terminal box which communicates with the rotating electrical machine outer casing and is attached to a lower portion of the rotating electrical machine outer casing, the support insulator installed in the terminal box, and the terminal box containing at least the power lines supported by the support insulator and a part of the high voltage bushing connected to the supported power lines,
wherein the support insulator is installed vertically on a bottom face of the terminal box, and
wherein the support insulator installed vertically and a portion of the high voltage bushing located in the terminal box are disposed in parallel with each other.

2. The rotating electrical machine according to claim 1, wherein the power lines include a connection ring that is connected to the stator coil, an armature lead that is connected to the high voltage bushing, and a lead wire that connects the connection ring to the armature lead, and
wherein the support insulator supports the armature lead.

3. The rotating electrical machine according to claim 2, wherein the lead wire and the armature lead are connected to each other through a flexible lead.

4. The rotating electrical machine according to claim 3, wherein the high voltage bushing includes:
an insulation cylinder having a gas inlet port, a hollow inside, and a hole in a lower portion of the insulation cylinder; and
an external copper tube that covers an outer periphery of the insulation cylinder with a predetermined space and has an exhaust port,
wherein the hole communicates with the space between the insulation cylinder and the external copper tube and,
wherein a coolant gas enters through the inlet port of the insulation cylinder, flows downward through the hollow inside of the insulation cylinder, flows through the hole upward in the space between the insulation cylinder and the external copper tube, and is discharged from the exhaust port of the external copper tube.

5. The rotating electrical machine according to claim 4, wherein the armature lead includes:
an elbow pipe that is connected to the exhaust port of the external copper tube and changes a flow direction of the coolant gas from a vertical direction to a horizontal direction; and
a copper pipe horizontally disposed, one end of which is connected to the elbow pipe and the other end of which is connected to a root component for the flexible lead, and
wherein the coolant gas exhausted upward from the exhaust port of the external copper tube flows into the elbow pipe, changes the flow direction from the vertical direction to the horizontal direction, enters the root component for the flexible lead through the copper pipe, merges with the coolant gas from above which has cooled the flexible lead at the root component for the flexible lead to flow downward, and passes through the support insulator installed vertically.

6. The rotating electrical machine according to claim 5, comprising:
a duct included in an axial direction in the bottom face of the terminal box,
wherein the coolant gas passing through the support insulator enters the duct, and
wherein the coolant gas entering the duct flows upward through a lateral face duct on a lateral face of the terminal box, and is exhausted through an exhaust gas pipe in an upper portion of the terminal box.

7. The rotating electrical machine according to claim 6, comprising:
six high voltage bushings, each of the high voltage bushings being according to claim 6;
six support insulators, each of the support insulators being according to claim 6; and
two ducts, each of the two ducts being according to claim 6,
wherein two rows of the high voltage bushings are disposed in the axial direction, each of the rows including three high voltage bushings in the horizontal direction of the rotating electrical machine, and
wherein the coolant gases passing through the six support insulators merge with each other at the bottom face of the terminal box and flows into the two ducts.

8. The rotating electrical machine according to claim 7, wherein the coolant gases from two central support insulators of the six support insulators are divided into right and left, pass through a support-insulator exhaust-gas junction duct included in the horizontal direction in the bottom face of the terminal box, merge with the coolant gases from other four support insulators at ends of the six support insulators, flow toward the ducts, flow upward through the lateral face duct, and are exhausted through the exhaust gas pipe.

* * * * *